United States Patent
Ozawa

(10) Patent No.: US 9,942,436 B2
(45) Date of Patent: Apr. 10, 2018

(54) MECHANISM FOR SUPPORTING A TRAVELING BODY

(71) Applicant: Junya Ozawa, Yamanashi-ken (JP)

(72) Inventor: Junya Ozawa, Yamanashi-ken (JP)

(73) Assignee: CANON FINETECH NISCA INC., Misato-Shi, Saitama (JP)

( * ) Notice: Subject to any disclaimer, the term of this patent is extended or adjusted under 35 U.S.C. 154(b) by 0 days.

(21) Appl. No.: 15/483,425

(22) Filed: Apr. 10, 2017

(65) Prior Publication Data

US 2017/0295292 A1     Oct. 12, 2017

(30) Foreign Application Priority Data

Apr. 12, 2016 (JP) ................................ 2016-079722

(51) Int. Cl.
*H04N 1/04*      (2006.01)
*H04N 1/10*      (2006.01)

(52) U.S. Cl.
CPC ........... *H04N 1/103* (2013.01); *H04N 1/1043* (2013.01); *H04N 2201/0081* (2013.01); *H04N 2201/0442* (2013.01); *H04N 2201/0446* (2013.01)

(58) Field of Classification Search
CPC ................. H94N 1/103; H04N 1/1043; H04N 2201/0081; H04N 2201/0442; H04N 2201/0446
USPC .................................. 358/482, 483, 497, 494
See application file for complete search history.

(56) References Cited

U.S. PATENT DOCUMENTS

| 2002/0089704 | A1* | 7/2002 | Hsiao | H04N 1/1013 358/474 |
| 2005/0088706 | A1* | 4/2005 | Lin | H04N 1/0313 358/474 |
| 2010/0328736 | A1* | 12/2010 | Ozawa | H04N 1/1017 358/494 |
| 2012/0190275 | A1* | 7/2012 | Aeschlimann | B23Q 1/38 451/28 |
| 2014/0240801 | A1* | 8/2014 | Kang | H04N 1/1065 358/497 |

FOREIGN PATENT DOCUMENTS

| JP | 2007-082006 A | 3/2007 |
| JP | 2011-118276 A | 6/2011 |

* cited by examiner

*Primary Examiner* — Cheukfan Lee
(74) *Attorney, Agent, or Firm* — Manabu Kanesaka

(57) ABSTRACT

A mechanism for supporting a traveling body includes a traveling body which reciprocates and shifts, a track member extending in a direction in which the traveling body shifts, a track surface provided in the track member to slide the traveling body, a drive section that drives the traveling body, and a slide member provided in the traveling body to support the traveling body slidably via a lubricant between the track surface and the slide member. The slide member includes a slide contact portion that slides on the track surface, a slide barrier portion provided on at least one side of the slide contact portion along a slide direction of the slide contact portion, and a guide portion which scrapes the lubricant in association with sliding of the slide contact portion, and guides the lubricant to between the slide contact portion and the slide barrier portion.

9 Claims, 7 Drawing Sheets

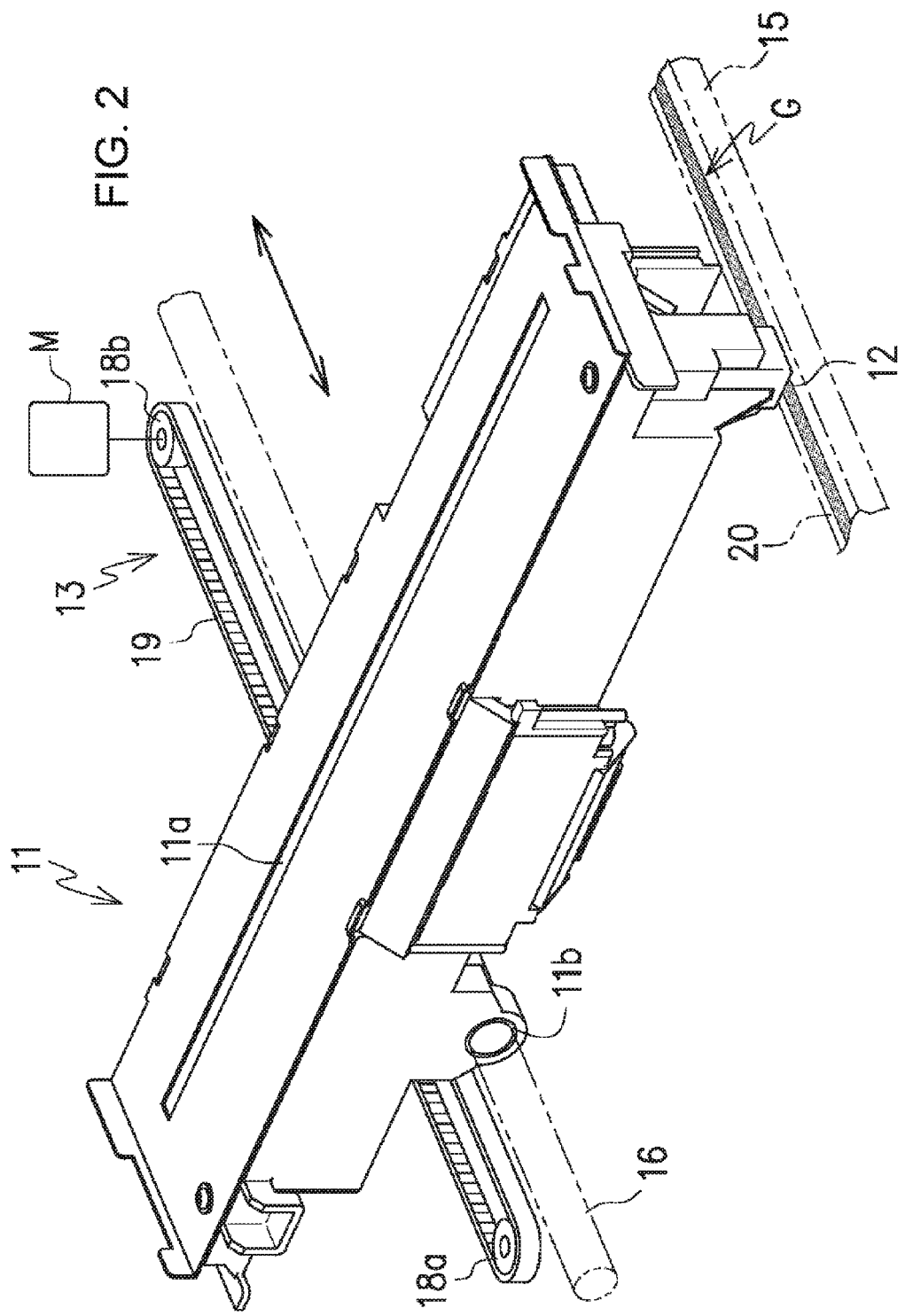

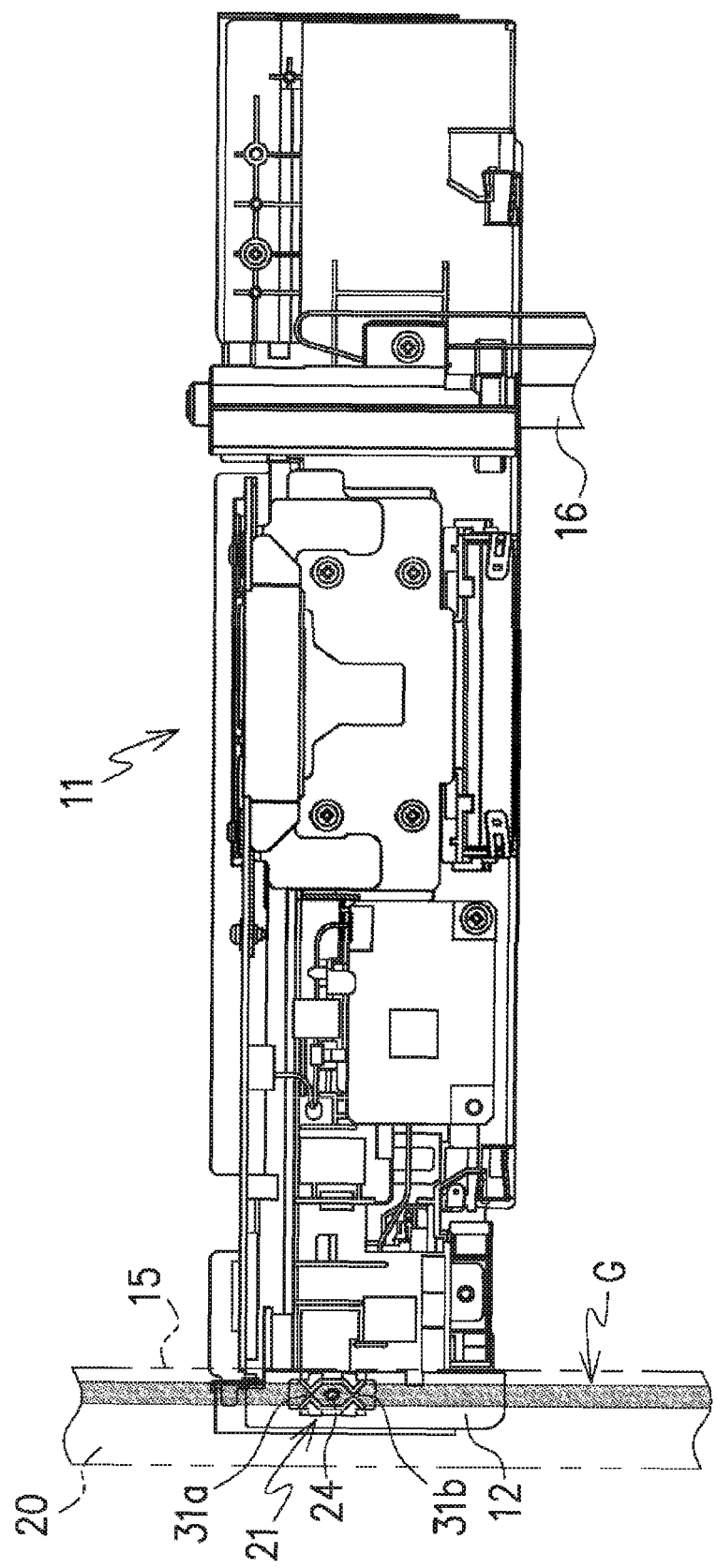

20 ... TRACK SURFACE
21 ... SLIDE MEMBER
24 ... SLIDE CONTACT PORTION
33, 34, 35, 36 ... GUIDE PORTION
37, 38 ... SLIDE BARRIER PORTION
G ... LUBRICANT

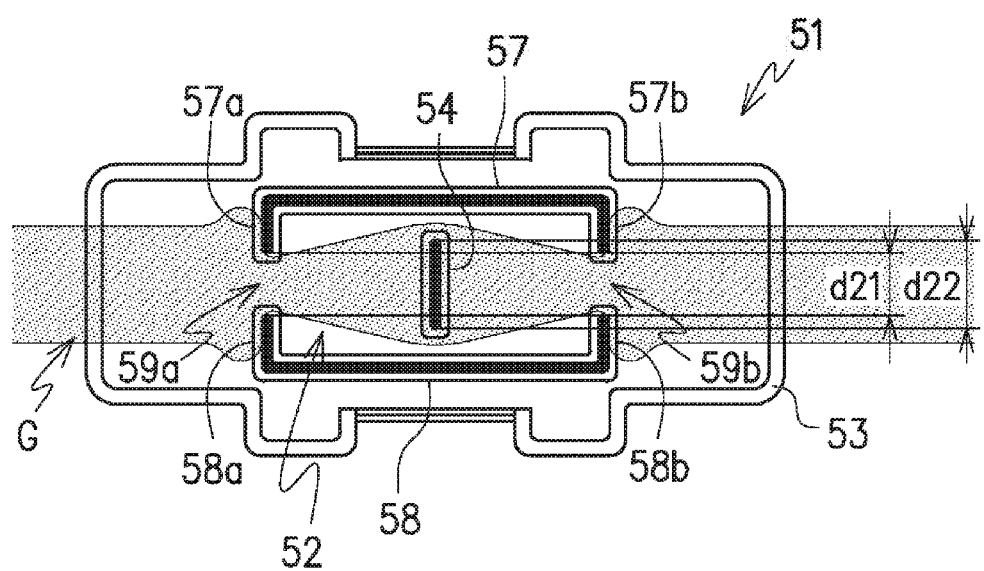

MECHANISM FOR SUPPORTING A TRAVELING BODY

BACKGROUND OF THE INVENTION

Technical Field

The present invention relates to a mechanism for supporting a traveling body provided with a read unit to perform read scanning on an image and the like, while shifting.

Description of the Related Art

Generally, an image read apparatus such as a scanner and copier is provided with platen to place an original document, and a mechanism to read the original document by causing a read unit to perform reciprocating motion from one end to the other end of the original document along the platen. As the read unit, for example, widely adopted is a configuration where a carriage is equipped with a light source for applying read light to an original document, and reflecting mirrors for deflecting reflected light from the original document in an imaging optical path direction, and performs reciprocating motion along the platen in a predetermined stroke to read the original document image.

As the carriage, known are a structure (e.g. CIS type scanner) equipped with a light source lamp, image formation lens, read element and the like, and another structure (e.g. CCD type scanner) equipped with a light source lamp and deflection mirror where the light from the deflection mirror is subjected to image formation on the read element from a condenser lens disposed separately from the carriage.

In such an image read apparatus, in order to read original document images sequentially while scanning, it is necessary that the carriage is configured as a reciprocating motion-capable traveling body, and that the traveling body is driven along a track member (guide rail) provided in an apparatus frame. The guide rail is comprised of two or three rail members disposed parallel with one another.

In Patent Document 1, a pair of guide rails is formed in an edge member of platen, and a bar-shaped guide rod is disposed in the center portion of the rails to support a carriage as a traveling body. Then, a support surface (slide surface) of the carriage engages in a track surface comprised of the guide rails and guide rod, and is driven to be towed via drive members such as a timing belt coupled to a drive motor. By this means, the carriage is capable of reciprocating and traveling in a predetermined stroke along the guide rails and the like.

In the carriage mounted on the image read apparatus, in order to eliminate read fluctuations of an image and the like, it is required to reduce friction with the track surface formed on the guide rails to slide smoothly. Therefore, it is necessary to cause a lubricant to exist between the slide surface of the carriage and the track surface. In regard to this respect, it is proposed in Japanese Unexamined Patent Publication No. 2007-082006 that a plurality of groove-shaped concave portions is provided in one of the track surface and the slide surface, and that the concave portion is impregnated with a high viscous lubricant. The plurality of concave portions is provided in a direction crossing a shift direction of the carriage, and it is configured that the lubricant flows into the plurality of concave portions with the shift of the carriage. Further, a bearing structure is also known where a bearing member is formed of porous sintered metal to be impregnated with the lubricant in bearing-supporting a traveling body such as the carriage.

Further, Japanese Unexamined Patent Publication No. 2011-118276 discloses a mechanism for supporting a traveling body where in order to cause a slider (slide member) of a carriage for reciprocating and traveling on a guide rail to slide in a stable state, a concave portion is provided inside the slide member, and a lubricant beforehand stored in the concave portion is flowed out onto the guide rail after traveling of the carriage so as to apply the lubricant to be stabilized when the traveling body returns and travels.

SUMMARY OF THE INVENTION

Problems to be Solved by the Invention

In Japanese Unexamined Patent Publication No. 2007-082006, a plurality of groove-shaped concave portions is provided in one of the track surface and the slide surface of the carriage to impregnate the concave portion with a lubricant. Then, since the concave portion is simply impregnated with the lubricant, in association with reciprocating motion of the carriage, the lubricant impregnated in the concave portion diffuses to the periphery, and there is the risk that a portion brought into contact with the track surface is not filled with the lubricant.

Further, in Japanese Unexamined Patent Publication No. 2011-118276, since the lubricant is applied onto the guide rail in a state in which a predetermined amount of the lubricant is beforehand included inside the slide member, when the number of reciprocating motion times of the traveling body increases, a state with a proper amount of the lubricant applied onto the guide rail is first obtained, and gradually, the amount of the lubricant remaining inside the slide member decreases. According to such a decrease in the lubricant, the viscosity of the lubricant and the like, the case arises that a sufficient amount of the lubricant is not applied onto the guide rail.

Therefore, it is an object of the present invention to provide a mechanism for supporting a traveling body that enables smooth traveling by a predetermined stroke to be performed, by providing a slide member including a flow channel to evenly flow in and flow out a lubricant existing between the traveling body such as a carriage and a track member such as a guide rail on which the traveling body performs reciprocating motion, in association with reciprocating motion of the traveling body.

Means for Solving the Problem

In order to attain the above-mentioned object, a mechanism for supporting a traveling body of the present invention is provided with a traveling body which reciprocates and shifts, a track member extending in a direction in which the traveling body shifts, a track surface provided in the track member to slide the traveling body, a drive section that drives the traveling body, and a slide member provided in the traveling body to support the traveling body slidably via a lubricant between the track surface and the slide member, where the slide member is provided with a slide contact portion that slides on the track surface, a slide barrier portion provided on at least one side of the slide contact portion along a slide direction of the slide contact portion, and a guide portion which scrapes the lubricant in association with sliding of the slide contact portion, and guides the lubricant to between the slide contact portion and the slide barrier portion.

Advantageous Effect of the Invention

According to the mechanism for supporting a traveling body of the present invention, in the traveling body that performs reciprocating motion in the direction in which the track member extends is provided the slide member provided with the slide contact portion, the guide portion that scrapes the lubricant toward the slide contact portion, and the slide barrier portion that regulates a flow of the scraped lubricant, and therefore, when the traveling body performs reciprocating motion on the track member, it is possible to always fill the periphery of the slide contact portion with the lubricant uniformly. By this means, the traveling body is capable of traveling stably in a predetermined stroke along the track member. Further, since the lubricant is always filled between the slide member and the track surface, it is possible to cause the traveling body to stably travel, without any unusual sound occurring due to rubbing and without any unnecessary vibration occurring.

BRIEF DESCRIPTION OF DRAWINGS

FIG. 2 is a perspective view illustrating a principal part of the mechanism for supporting a traveling body;

FIG. 3 is a plan view, looking the mechanism for supporting a traveling body from a start member;

FIG. 9 is a bottom view of a slide member of Embodiment 4.

MODE FOR CARRYING OUT THE INVENTION

Figure 1:
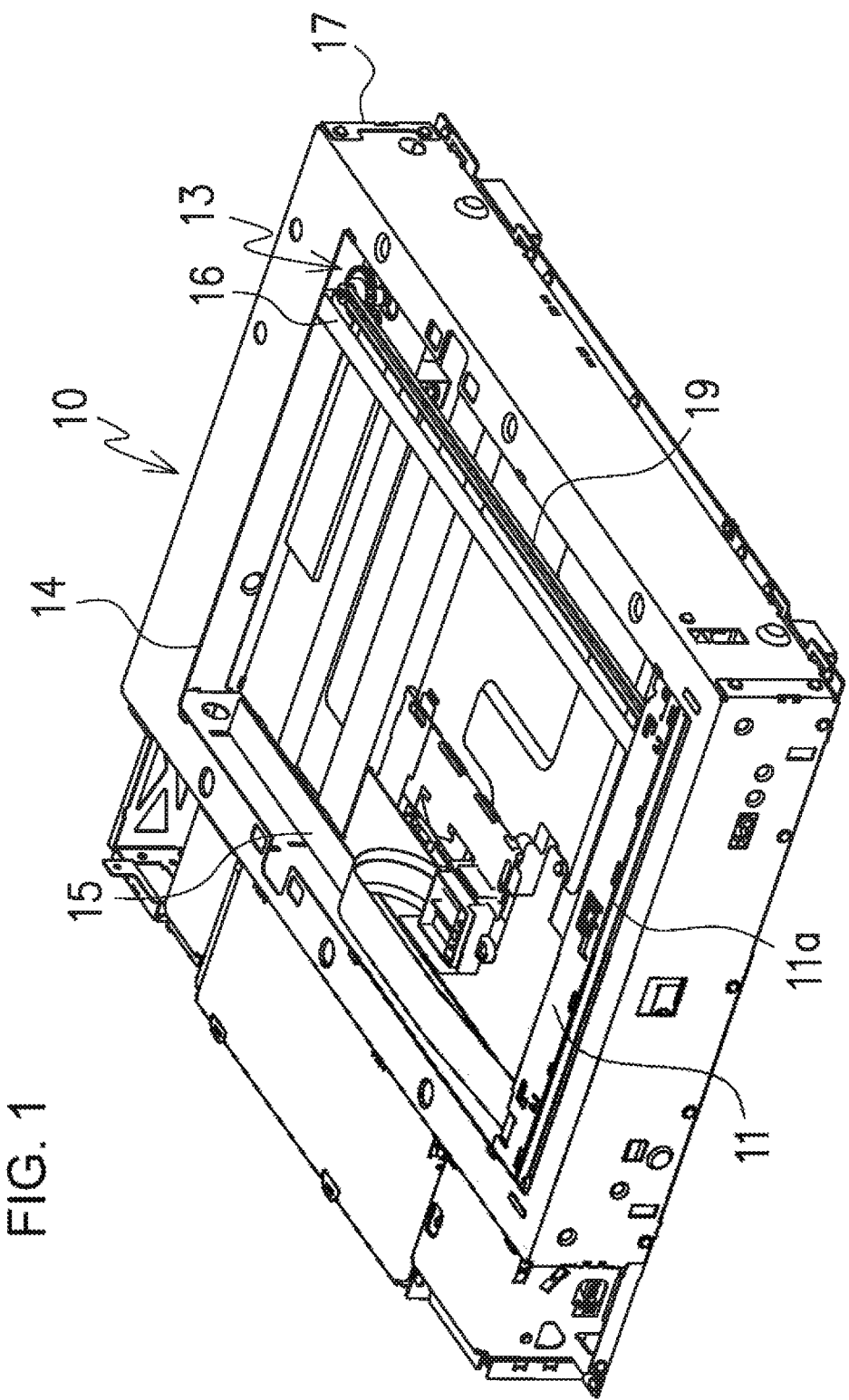
FIG. 1 is a perspective view illustrating internal structure of an image read apparatus provided with a mechanism for supporting a traveling body of the present invention.

Embodiments of a mechanism for supporting a traveling body according to the present invention will be described below in detail with reference to drawings. As an example, FIG. 1 illustrates an image read apparatus 10 installed with the mechanism for supporting a traveling body according to the present invention. The image read apparatus 10 is provided with an apparatus frame 17 including platen 14 that is a placement face of a read original document, first track member (guide rail) 15 and second track member (guide rod) 16 that extend parallel in a longitudinal direction (sub-scanning direction) inside the apparatus frame 17, a traveling body (carriage) 11 disposed to be able to perform reciprocating motion in a predetermined stroke from one ends to the other ends of the guide rail 15 and the guide rod 16, and a drive section 13 to drive the carriage 11. The carriage 11 is provided with a read opening 11a that corresponds to a read width (main scanning direction) of an original document, and an optical unit (not shown) provided with a light source and a plurality of mirror groups to read an image of the original document below the read opening 11a. Then, read light is applied to the original document from the read opening 11a through the platen 14, the reflected light is read by an imaging element provided in the optical unit, and the image of the original document is thereby recognized.

As shown in FIG. 2, a bearing 11b is provided at one end of the carriage 11, and the guide rod 16 penetrates the bearing 11b in a free state. Further, the other end of the carriage 11 is provided with a slide surface 12 opposed to a track surface 20 of the guide rail 15, to the slide surface 12 is attached a slide member 21 described later, and the slide member 21 slides via a flowable lubricant G such as a grease applied on the track surface 20. The drive section 13 is provided with a pair of pulleys 18a, 18b provided at opposite ends in a longitudinal direction of the guide rod 16, a timing belt 19 looped between the pair of pulleys 18a, 18b, and a drive motor M that drives one of the pulleys 18b forward and backward, and a part of the carriage 11 is coupled to the timing belt 19. By driving the drive motor M forward or backward, the carriage 11 is capable of performing reciprocating motion in a predetermined stroke along the guide rail 15 and the guide rod 16.

Figure 4A:
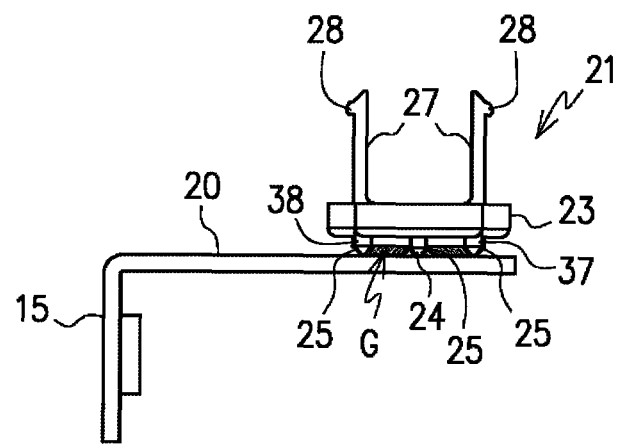
FIG. 4A is a cross-sectional view, looking the mechanism for supporting a traveling body in a sub-scanning direction.
Figure 4B:
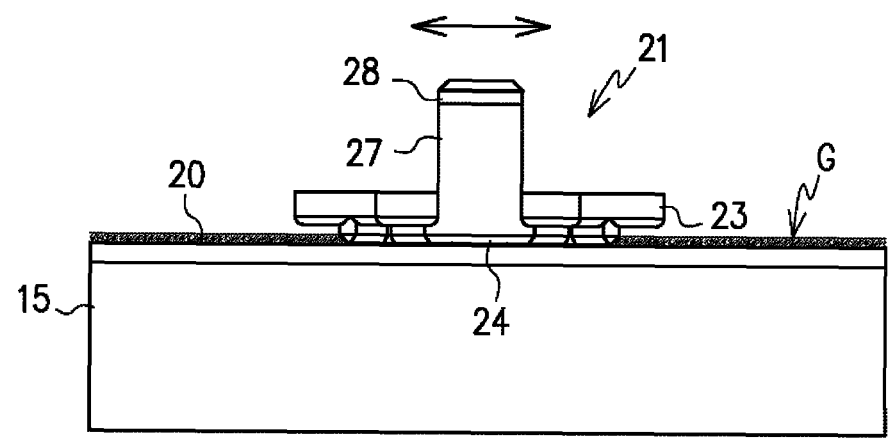
FIG. 4B is a cross-sectional view, looking the mechanism in a main scanning direction.

As shown in FIG. 3, the slide surface 12 of the carriage 11 is provided with the slide member 21 that efficiently scrapes the lubricant G applied on the track surface 20 to slide. As shown in FIGS. 4A and 4B, the slide member 21 includes a rectangle base portion 23 having a pair of engagement pieces 27 that engages in the slide surface 12 of the carriage 11 detachably, a block-shaped slide contact portion 24 provided in a center portion on the side contacting the track surface 20 of the base portion 23 to slide while being brought into contact with the track surface 20, a pair of slide barrier portions 37, 38 provided so as to sandwich the slide contact portion 24 along the track surface 20, first guide portions 33, 34 and second guide portions 35, 36 respectively provided in the vicinities of the direction (upstream side and downstream side) in which the slide contact portion 24 slides, a flow channel 26 provided between the slide contact portion 24 and the pair of slide barrier portions 37, 38 to change a flow of the lubricant G, and a pair of opening portions 31a, 31b opened toward the flow channel 26.

The slide member 21 is fixed to the slide surface 12 of the carriage 11 via the pair of engagement pieces 27. In the pair of engagement pieces 27, an engagement protrusion 28 is provided at the front end of each of the pieces, and in inserting in a pair of engagement grooves (not shown) provided in the slide surface 12, the engagement protrusion 28 engages in the front end of the engagement groove. By this means, the slide member 21 is capable of sliding on the track surface 20 integrally with the carriage 11. Further, in removing the slide member 21 from the slide surface 12 of the carriage 11, by nipping the pair of engagement pieces 27 to sag inward, it is possible to release the lock by the engagement protrusion 28.

Figure 5:
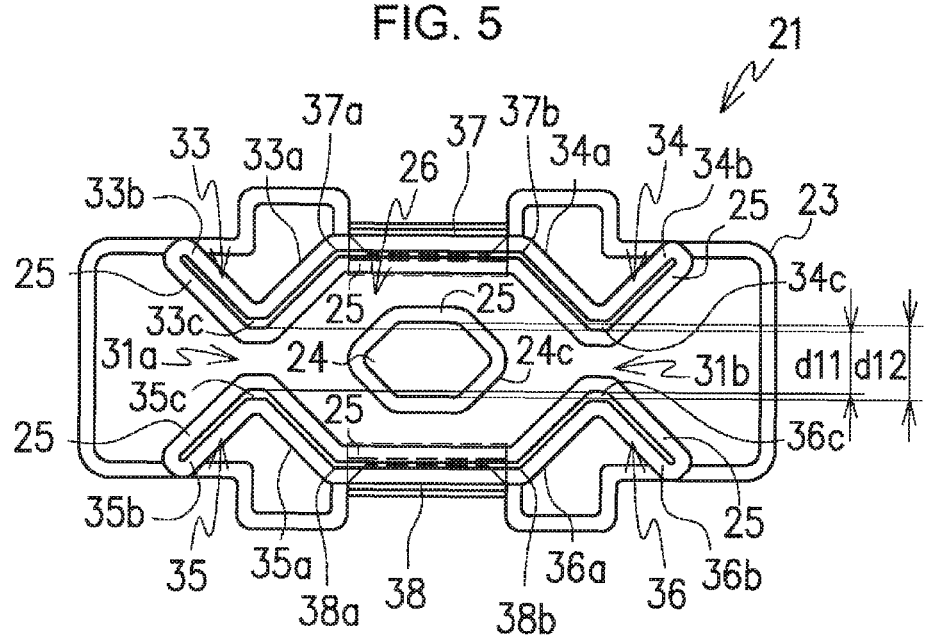
FIG. 5 is a bottom view of a slide member of Embodiment 1.
Figure 6:
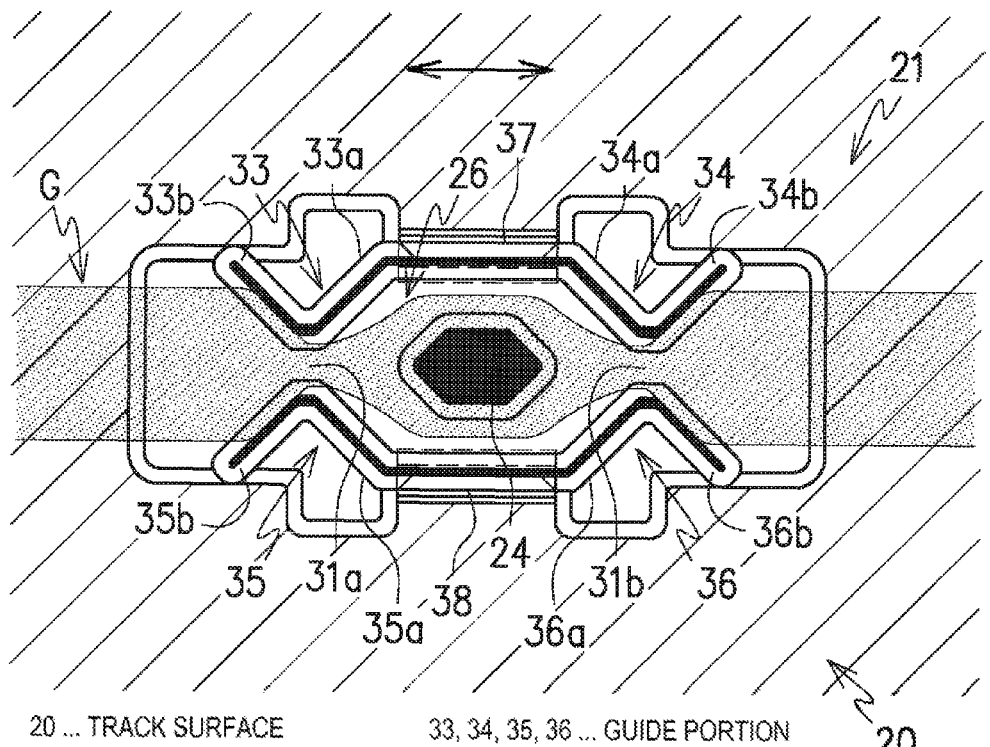
FIG. 6 is an explanatory view illustrating a flow of a lubricant in the slide member of Embodiment 1.

As shown in FIG. 5, the slide contact portion 24 includes a surface 24a facing the opening portions 31a, 31b, and the surface 24a is formed in a convex shape toward the upstream side and the downstream side in the slide direction, with reference to the center of the width of the opening portions 31a, 31b orthogonal to the slide direction of the slide contact portion 24. Therefore, as shown in FIG. 6, it is possible to guide the lubricant G flowing in the flow channel 26 from one of the opening portions 31a (31b) toward the other opening portion 31b (31a), so as to split along the outer region surface of the slide contact portion 24. Further, since the slide contact portion 24 is in a symmetrical shape viewed from the pair of opening portions 31a, 31b, when the slide member 21 performs reciprocating motion along the track surface 20, the flow of the lubricant G inside the flow channel 26 is certain in any direction, and the outer region portion of the slide contact portion 24 is always filled with a certain amount of the lubricant G.

As shown in FIG. 5, the first guide portions 33, 34 extend respectively from opposite ends 37a, 37b of one of the slide barrier portions 37, and the second guide portions 35, 36 extend respectively from opposite ends 38a, 38b of the other slide barrier portion 38.

As shown in FIG. 3, the pair of slide barrier portions 37, 38 has a role in preventing the lubricant G guided to the slide contact portion 24 via each of the opening portions 31a, 31b of the first guide portions 33, 34 and the second guide portions 35, 36 from leaking to the outside of the track surface 20, when the carriage 11 slides on the track surface 20 of the guide rail 15. In addition, it is possible to regulate the flow of the lubricant G by the first guide portions 33, 34 and second guide portions 35, 36, and therefore, the slide barrier portions 37, 38 may exist at least on one side.

The first guide portions 33, 34 are formed of first inclined walls 33a, 34a tilting in a direction of approaching the slide contact portion 24 in a direction orthogonal to the slide direction respectively from the opposite ends 37a, 37b of the slide barrier portion 37, and second inclined walls 33b, 34b tilting toward a direction of separating from the slide contact portion 24 with front ends 33c, 34c of the first inclined walls 33a, 34a as starting points. Further, the second guide portions 35, 36 are formed of first inclined walls 35a, 36a tilting in the direction of approaching the slide contact portion 24 in the direction orthogonal to the slide direction respectively from the opposite ends 38a, 38b of the slide barrier portion 38, and second inclined walls 35b, 36b tilting toward the direction of separating from the slide contact portion 24 with front ends 35c, 36c of the first inclined walls 35a, 36a as starting points. In addition, in this Embodiment, the first guide portions 33, 34 and second guide portions 35, 36 are formed integrally with the slide barrier portions 37, 38, respectively, and each portion may be formed independently and spaced a predetermined distance apart from one another.

The opening portions 31a, 31b with predetermined widths are formed respectively between the front end 33c of the first inclined wall 33a of the first guide portion 33 opposed to the one, and the front end 35c of the first inclined wall 35a of the second guide portion 35, and between the front end 34c of the first inclined wall 34a of the first guide portion 34 opposed to the other one, and the front end 36c of the first inclined wall 36a of the second guide portion 36.

In the slide member 21 configured as described above, the periphery of the slide contact portion 24 surrounded by the pair of slide barrier portions 37, 38 and guide portions 33, 34, 35, 36 is the flow channel 26 of the lubricant G, and via the opening portions 31a, 31b, it is possible to flow the lubricant G in/out of the flow channel 26.

The guide portions 33, 34, 35, 36 are of a mirror symmetric arrangement configuration with respect to the slide contact portion 24 as the center, and then, lengths and inclined angles respectively of the first inclined wall and second inclined wall are all common. Therefore, when the slide member 21 reciprocates and shifts, in any direction, it is possible to keep the amount of the lubricant G passing through the flow channel 26 constant.

As shown in FIGS. 4A, 4B and 5, the slide contact portion 24, slide barrier portions 37, 38 and guide portions 33, 34, 35, 36 have taper surfaces 25 tapered toward the track surface 20. By this means, since the contact area between the slide member 21 and the track surface 20 decreases, it is possible to reduce friction resistance in sliding, the lubricant G penetrates the periphery of the tapered surface 25, and it is thereby possible to make sliding more smooth.

As shown in FIG. 5, in the relationship with the slide contact portion 24, an opening width d11 of the pair of opening portions 31a, 31b is formed to be the same as a width d12 opposed to the slide direction of the slide contact portion 24, or formed to be narrower than the width d12. By thus regulating the opening width of the pair of opening portions 31a, 31b with respect to the width opposed to the slide direction of the slide contact portion 24, long residence time of the lubricant G is secured inside the flow channel 26, and it is thereby possible to always fill the periphery of the slide contact portion 24 with a sufficient amount of the lubricant G for a period during which the carriage 11 reciprocates and shifts on the track surface 20.

Since the second inclined walls 33b, 34b of the first guide portions 33, 34 and the second inclined walls 35b, 36b of the second guide portions 35, 36 extend at a predetermined angle with respect to the slide direction of the slide contact portion 24, when the slide member 21 is slid toward the one opening portion 31a side, as shown in FIG. 6, it is possible to scrape the lubricant G spread in the width direction of the track surface 20 toward the opening portion 31a by the second inclined walls 33b, 35b on one side. Then, the scraped lubricant G is guided into the flow channel 26 through the opening portion 31a, is split in two directions by the slide contact portion 24 so as to flow around, is then collected by the first inclined walls 34a, 36a on the other side, and subsequently, is capable of flowing onto the track surface 20 again from the opening portion 31b. At this point, the outer region portion of the slide contact portion 24 is in a state of being always filled with a certain amount of the lubricant G, and the balance is substantially achieved between the amount of the lubricant G flowing in from the one opening portion 31a and the amount of the lubricant G flowing out of the other opening portion 31b.

Further, when the slide member 21 is slid toward the opening portion 31b side, the lubricant G spread in the width direction of the track surface 20 is scraped toward the opening portion 31b by the second inclined walls 34b, 36b on one side, is guided into the flow channel 26 through the opening portion 31b, is split in two directions by the slide contact portion 24 so as to flow around, is then collected by the first inclined walls 33a, 35a on the other side, and subsequently, is capable of flowing onto the track surface 20 again from the opening portion 31a.

Thus, according to the slide member 21 of the present invention, in a traveling section from one end to the other end of the track surface 20 on which the carriage 11 shifts, the flow channel 26 is always filled with a just enough certain amount of the lubricant G, and it is thereby possible to always maintain friction resistance between the track surface 20 and the slide contact portion 24 at low and constant resistance. By this means, it is possible to cause the carriage 11 to travel in an accurate and stable state, while controlling by a predetermined stroke.

Figure 7:
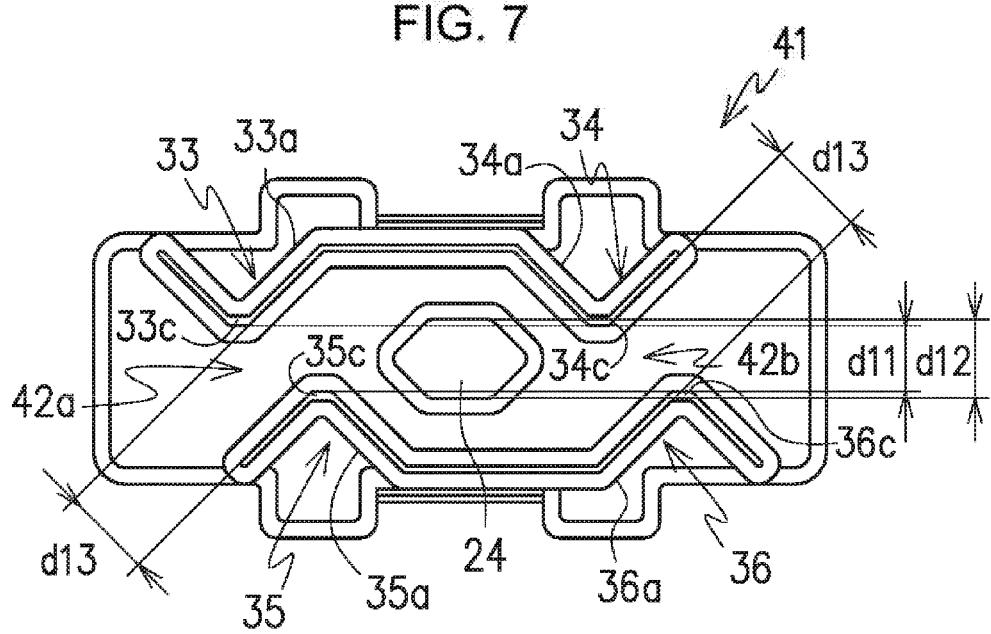
FIG. 7 is a bottom view of a slide member of Embodiment 2.

FIG. 7 illustrates a configuration example of a slide member 41 of Embodiment 2. In the slide member 41 of this Embodiment, the front ends 33c, 34c, 35c, 36c of the first inclined walls 33a, 34a, 35a, 36a respectively of the first guide portions 33, 34 and second guide portions 35, 36 shown in FIG. 5 are disposed in mutually displaced positions with respect to the slide direction of the slide contact portion 24, with the slide contact portion 24 as the center. Thus, by displacing the front ends 33c, 34c, 35c, 36c, it is possible to set second opening widths d13 of opening portions 42a, 42b to be wider than the first opening width d11. By this means, it is possible to more increase the lubricant G flowing inside the flow channel 26 with the slide contact portion 24 as the center, and it is possible to cause the carriage 11 to reciprocate and shift more smoothly along the track surface 20. In this Embodiment, since displacement amounts of the front ends 33c, 34c, 35c, 36c are set at the same amount, the distances d13 of the opening portions 42a, 42b are also the same, and it is possible to always keep a constant flow rate and flow velocity of the lubricant G flowing in/out of the flow channel 26 in association with the reciprocating shift of the slide member 41.

Further, also in this Embodiment 2, as in Embodiment 1 shown in FIG. 5, in the relationship with the slide contact portion 24, the first opening width d11 of the pair of opening portions 42a, 42b is formed to be the same as the width d12 opposed to the slide direction of the slide contact portion 24, or formed to be narrower than the width d12. By thus regulating the opening width of the pair of opening portions 42a, 42b in a direction in which the width is narrower than the width opposed to the slide direction of the slide contact portion 24, it is possible to guide the lubricant G onto the track drawn on the track surface 20 by the contact portion 24. By this means, it is possible to always fill the periphery of the slide contact portion 24 with a required sufficient amount of the lubricant G for a period during which the carriage 11 reciprocates and shifts on the track surface 20.

Figure 8:
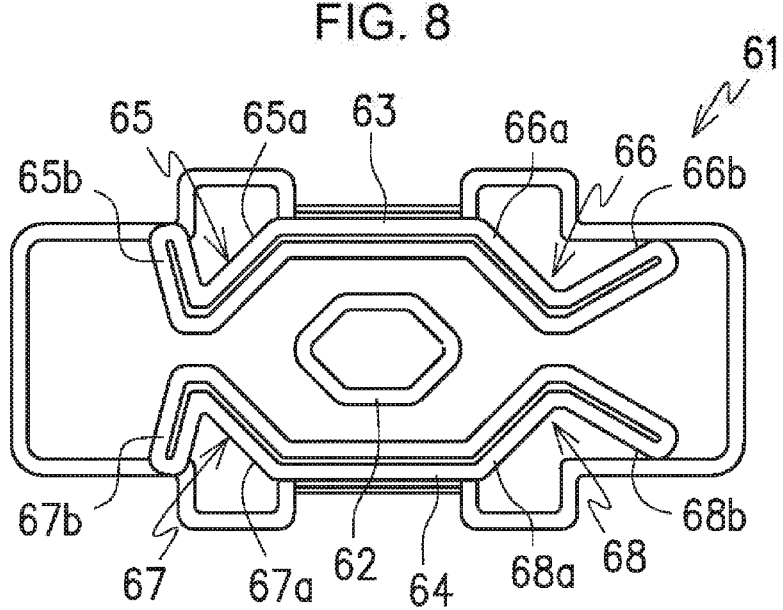
FIG. 8 is a bottom view of a slide member of Embodiment 3.

In the slide members 21, 41 of the above-mentioned Embodiments 1 and 2, the same inclined angle is set on all the first inclined walls 33a, 34a, 35a, 36a and the second inclined walls 33b, 34b, 35b, 36b respectively constituting the guide portions 33, 34, 35, 36, and as in a slide member 61 of Embodiment 3 shown in FIG. 8, it is possible to vary inclined angles of second inclined walls 65b, 66b respectively of first guide portions 65, 66. Further, in accordance therewith, it is also possible to vary inclined angles of second inclined walls 67b, 68b respectively of second guide portions 67, 68. In FIG. 8, the inclined angle of a pair of second inclined walls 65b, 67b positioned on one side in a slide direction of a slide contact portion 62 is set to be large, and the inclined angle of a pair of second inclined walls 66b, 68b positioned on the other side in the slide direction is set to be small. By this means, in regarding the second inclined walls 65b, 67b side as a read direction of the original document, it is possible to shift, while taking in a larger amount of the lubricant G, and in regarding the second inclined walls 66b, 68b side as a return direction where read is finished, it is possible to make a take-in amount of the lubricant G small and shift at high velocity. By this means, it is possible to efficiently perform read scanning of continued original documents.

FIG. 9 illustrates a slide member 51 of Embodiment 4. The slide member 51 is obtained by simplifying the slide member 21 of the above-mentioned Embodiment 1. A slide contact portion 54 coming into contact with the track surface 20 of the guide rail 15 is formed in a rectangle shape comprised of long-side portions extending in a direction orthogonal to the longitudinal direction of the track surface 20 and short-side portions extending parallel with the track surface 20. Further, a guide portion that guides the lubricant G is formed of vertical walls 57a, 57b, 58a, 58b extending orthogonally from opposite ends of a pair of slide barrier portions 57, 58 opposed to each other with the slide contact portion 54 therebetween. In addition, with respect to a base portion 53 provided with the slide contact portion 54 and a pair of slide barrier portions 57, 58 and members such as engagement pieces (not shown) attachable to the slide surface 12 of the carriage 11, the portion and members are common to the slide member 21 of Embodiment 1, and the description thereof is omitted.

A pair of opening portions 59a, 59b through which the lubricant G flows in/out is formed of gaps between front ends of the vertical walls 57a, 57b, 58a, 58b respectively of the slide barrier portions 57, 58. An opening width d21 of the pair of opening portions 59a, 59b is formed to be narrower than a width d22 in a longitudinal direction of the slide contact portion 54.

The slide member 51 of this Embodiment has a role in preventing the lubricant G flowing inside a flow channel 52 from leaking, by inner side surfaces of the vertical walls 57a, 57b, 58a, 58b respectively of the slide barrier portions 57, 58, and scraping the lubricant G applied on the track surface 20 by outer side walls of the vertical walls 57a, 57b, 58a, 58b to guide to the flow channel 52 from each of the opening portions 59a, 59b.

The mechanism for supporting a traveling body shown in each of the above-mentioned Embodiments is to make sliding smooth between the guide rail 15 extending along the read surface of the original document and the carriage 11 provided with the optical unit traveling along the guide rail 15 in an image read apparatus installed in a scanner, copier and the like, but is not limited to such an image read apparatus provided with the optical unit. For example, it is possible to apply to a printer head for printing, while repeating a shift in a certain direction with respect to a support member such as a shaft and rail used in an inkjet printer and the like. Further, in a post-processing apparatus provided with a staple unit for collecting sheets output from an image formation apparatus to perform binding processing, the binding processing is sometimes performed in a plurality of portions of sheets. In this case, in order for the staple unit to perform the binding processing in a plurality of portions of sheets, the staple unit is shifted with respect to a support member that supports the staple unit, in a direction crossing the direction in which the sheet is transported. It is possible to apply also to the apparatus for thus shifting the staple unit. Further, it is possible to apply to various kinds of manufacturing apparatuses, transport mechanisms of parts, members and the like in manufacturing apparatuses, a part of a shift section of logistics, and particularly, all shifting products that slide via a flowable friction reducing means such as a lubricant.

In addition, this application claims priority from Japanese Patent Application No. 2016-079722 incorporated herein by reference.

What is claimed is:

1. A mechanism for supporting a traveling body, comprising:
   a traveling body adapted to shift;
   a track member extending in a direction in which the traveling body shifts;
   a track surface provided in the track member to slide the traveling body;
   a drive section adapted to drive the traveling body; and
   a slide member provided in the traveling body to support the traveling body slidably via a lubricant between the track surface and the slide member,
   wherein the slide member is provided with a slide contact portion that slides on the track surface,
   a slide barrier portion provided on at least one side of the slide contact portion along a slide direction of the slide contact portion, and
   a guide portion which scrapes the lubricant in association with sliding of the slide contact portion, and guides the lubricant to between the slide contact portion and the slide barrier portion.

2. The mechanism for supporting a traveling body according to claim 1, wherein the slide barrier portion extends along a shift direction of the traveling body.

3. The mechanism for supporting a traveling body according to claim 1, wherein the guide portion is provided near an upstream side in the slide direction of the slide contact portion, and includes a first inclined wall tilting toward a direction of approaching the slide contact portion from an end portion side of the slide barrier portion, and a second inclined wall tilting toward a direction of separating from the slide contact portion from a front end of the first inclined wall.

4. The mechanism for supporting a traveling body according to claim 3, wherein the guide portion is disposed as a pair on opposite sides with the slide contact portion therebetween, and an opening portion is formed between a first guide portion and a second guide portion, near the front end of the first inclined wall of each guide portion.

5. The mechanism for supporting a traveling body according to claim 4, wherein in the first guide portion and the second guide portion disposed on the opposite sides with the slide contact portion therebetween, a position of the front end of the first inclined wall of each guide portion is displaced mutually with respect to the slide direction of the slide contact portion.

6. The mechanism for supporting a traveling body according to claim 4, wherein the slide contact portion includes a surface facing the opening portion formed between the first guide portion and the second guide portion, and the surface is formed in a convex shape toward the upstream side in the slide directing, with reference to a center of a width of the opening portion orthogonal to the slide direction of the slide contact portion.

7. The mechanism for supporting a traveling body according to claim 1, wherein the guide portion is provided near each of an upstream side and a downstream side in the slide direction of the slide contact portion.

8. The mechanism for supporting a traveling body according to claim 1, wherein the slide barrier portion is provided on opposite sides of the slide contact portion, and the guide portion extends from opposite ends of each slide barrier portion.

9. The mechanism for supporting a traveling body according to claim 1, wherein each of the slide contact portion, the slide barrier portion and the guide portion includes a taper surface tapered toward the track surface.

\* \* \* \* \*